United States Patent [19]

Skaar et al.

[11] Patent Number: 5,300,869
[45] Date of Patent: Apr. 5, 1994

[54] NONHOLONOMIC CAMERA SPACE MANIPULATION

[75] Inventors: Steven B. Skaar, Granger, Ind.; William H. Brockman, Ames, Iowa; Richard K. Miller, Ames, Iowa; Issac Yalda-Mooshabod, Ames, Iowa

[73] Assignee: Iowa State University Research Foundation, Inc., Ames, Iowa

[21] Appl. No.: 86,749

[22] Filed: Jul. 1, 1993

Related U.S. Application Data

[63] Continuation of Ser. No. 922,183, Jul. 30, 1992, abandoned.

[51] Int. Cl.$^5$ .............................................. B62D 1/00
[52] U.S. Cl. ..................................... 318/587; 318/586; 318/580; 318/568.12; 395/89; 395/94; 901/1
[58] Field of Search ............... 318/139, 16, 560–646; 901/1, 3, 5, 7, 9, 12, 13, 15–23, 45–48; 395/80–99; 180/167–169; 414/730, 731, 732, 735; 250/203 R; 364/478, 424.02

[56] References Cited

U.S. PATENT DOCUMENTS

| | | | |
|---|---|---|---|
| 3,165,899 | 1/1965 | Shatto, Jr. | 61/69 |
| 4,044,377 | 8/1977 | Bowerman | 7/18 |
| 4,118,730 | 10/1978 | Lemelson | 358/93 |
| 4,146,924 | 3/1979 | Birk et al. | 318/568 |
| 4,187,051 | 2/1980 | Kirsch et al. | 414/744 |
| 4,305,130 | 12/1981 | Kelley et al. | 364/513 |

(List continued on next page.)

OTHER PUBLICATIONS

Wernll, Robert L., "Robotics Undersea", Mechanical Engineering, Aug., 1982.
Jarvis, John F., "Research Directions In Industrial Machine Vision: A Workshop Summary", Computer, Dec. 1982.
Filo, Andrew, "Designing a Robot From Nature Part 2: Constructing the Eye", BYTE, Mar. 1979.
Baum, Michael, "Giving A Robot The Eye", Apr., 1979.
Second Generation Robots Have Eye For Industry, DM, Jun., 1979.
Catros, Jean-Yves; Espiau, Bernard, "Utilisation de Capteurs Optiques de Proximate en Robotique Industrielle", Lenouvel Automatisme, May/Jun. 1980.
Skaar, S. B. et al, "An Adaptive Vision-Based Manipulator Control Scheme".

*Primary Examiner*—Paul Ip
*Attorney, Agent, or Firm*—Zarley, McKee, Thomte, Voorhees & Sease

[57] ABSTRACT

A nonholonomic camera space manipulation system which allows a mobile manipulator which can have both holonomic and nonholonomic movement to autonomously use computer vision to move with respect to a goal position without any prior knowledge or calibration between the two or more video cameras used with the computer vision and the manipulator base or arm, the cameras and the goal, or the base and arm and the goal position. Cues are associated with the manipulator arm and the goal position(s) or target bodies; the cues being distinguishable in the two dimensional focal plane camera spaces of the cameras from the surrounding environment. A processing unit, identifying the position of the cues in each camera space, compares those positions and instructs movements of the manipulator base and/or manipulator arm to achieve movement of the visual cue on the arm with respect to the goal position or target body visual cue in camera space. These instructions are based upon estimations of what movement is required to bring two visual cues in each camera space together or into the required camera-space configuration. Once movement of the manipulator base and arm has begun, the system tracks this movement and adjusts its estimations and instructions according to monitoring of the visual cues in the camera spaces. By utilizing the different angles of the two or more camera means, the continuous monitoring of the visual cue positions in each camera space leads to actual successful movement of the manipulator base and arm to a desired goal position or target body in actual physical space.

42 Claims, 3 Drawing Sheets

U.S. PATENT DOCUMENTS

| | | | |
|---|---|---|---|
| 4,344,146 | 8/1982 | Davis, Jr. et al. | 7/2 |
| 4,380,696 | 4/1983 | Masaki | 219/124.34 |
| 4,402,053 | 8/1983 | Kelley et al. | 364/513 |
| 4,425,751 | 1/1984 | Bousseau et al. | 56/327 |
| 4,453,085 | 6/1984 | Pryor | 250/203 |
| 4,488,242 | 12/1984 | Tabata et al. | 318/568 |
| 4,565,487 | 1/1986 | Kroczynski | 414/730 |
| 4,575,304 | 3/1986 | Nakagawa et al. | 414/730 |
| 4,613,803 | 9/1986 | Hasegawa et al. | 318/587 X |
| 4,613,942 | 9/1986 | Chen | 395/94 |
| 4,636,137 | 1/1987 | Lemelson | 414/730 |
| 4,638,445 | 1/1987 | Mattaboni | 901/1 X |
| 4,639,878 | 1/1987 | Day et al. | 395/89 X |
| 4,642,204 | 3/1987 | Arnett | 414/751 |
| 4,664,590 | 5/1987 | Maekawa | 901/1 X |
| 4,679,152 | 7/1987 | Perdue | 364/513 |
| 4,698,775 | 10/1987 | Koch et al. | 364/478 |
| 4,707,647 | 11/1987 | Coldren et al. | 318/568 |
| 4,754,415 | 6/1988 | George et al. | 395/89 |
| 4,789,940 | 12/1988 | Christian | 364/468 |
| 4,815,008 | 3/1989 | Kadonoff et al. | 364/559 X |
| 4,833,383 | 5/1989 | Skarr et al. | 395/94 |
| 4,835,450 | 5/1989 | Suzuki | 318/568 |
| 4,843,287 | 6/1989 | Taft | 318/568 |
| 4,843,561 | 6/1989 | Larson | 364/478 |
| 4,924,153 | 5/1990 | Toru et al. | 318/587 |
| 4,940,925 | 7/1990 | Wand et al. | 318/587 |
| 4,942,512 | 7/1990 | Kohno | 395/94 X |

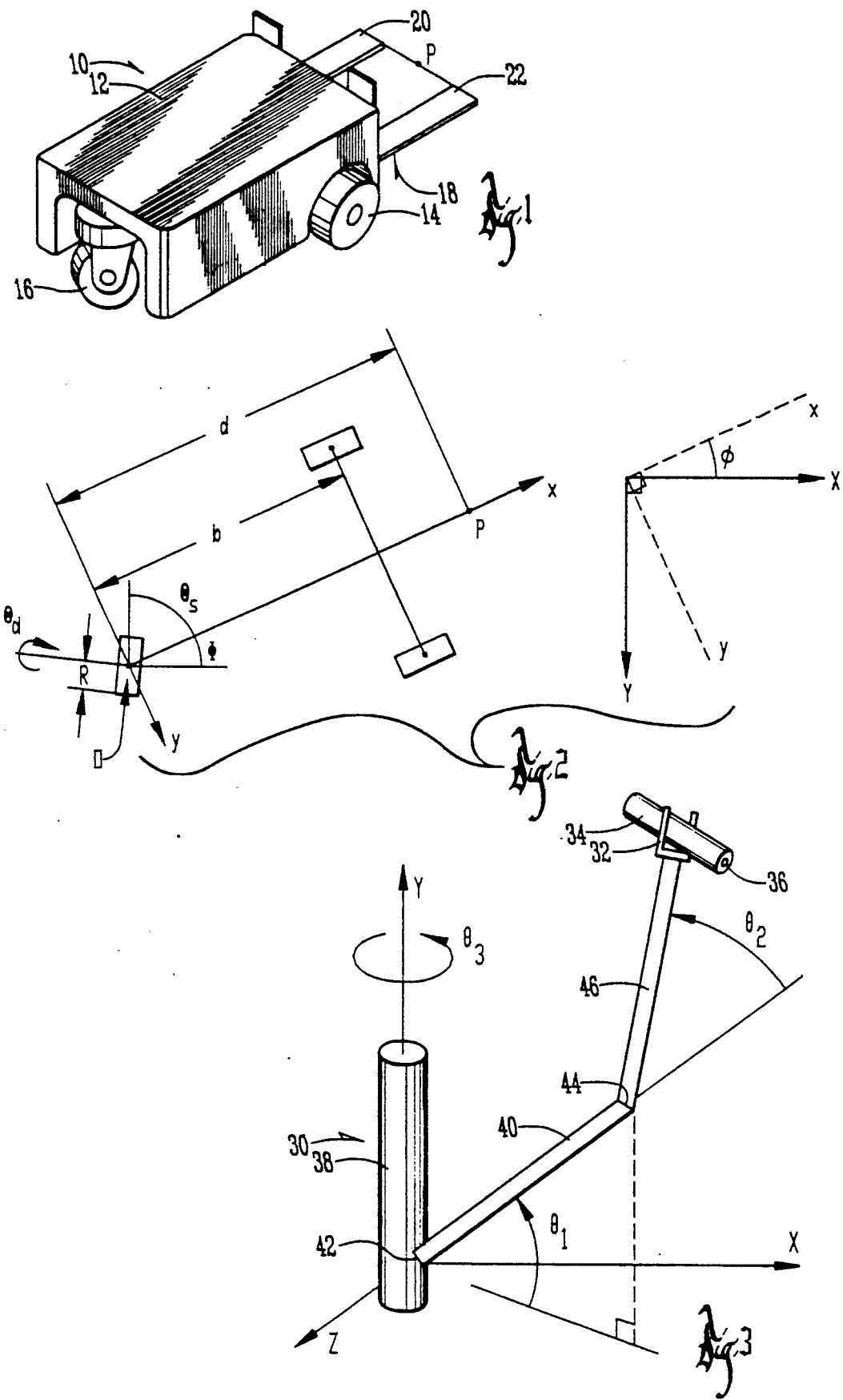

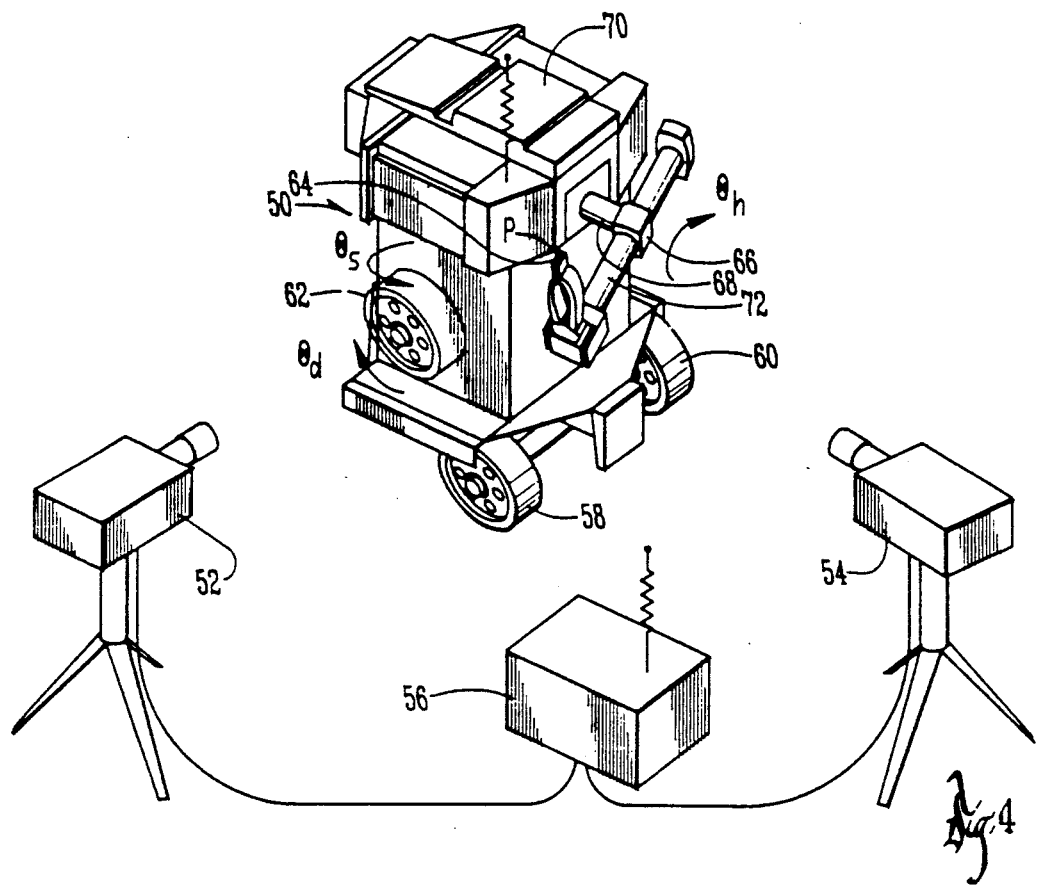
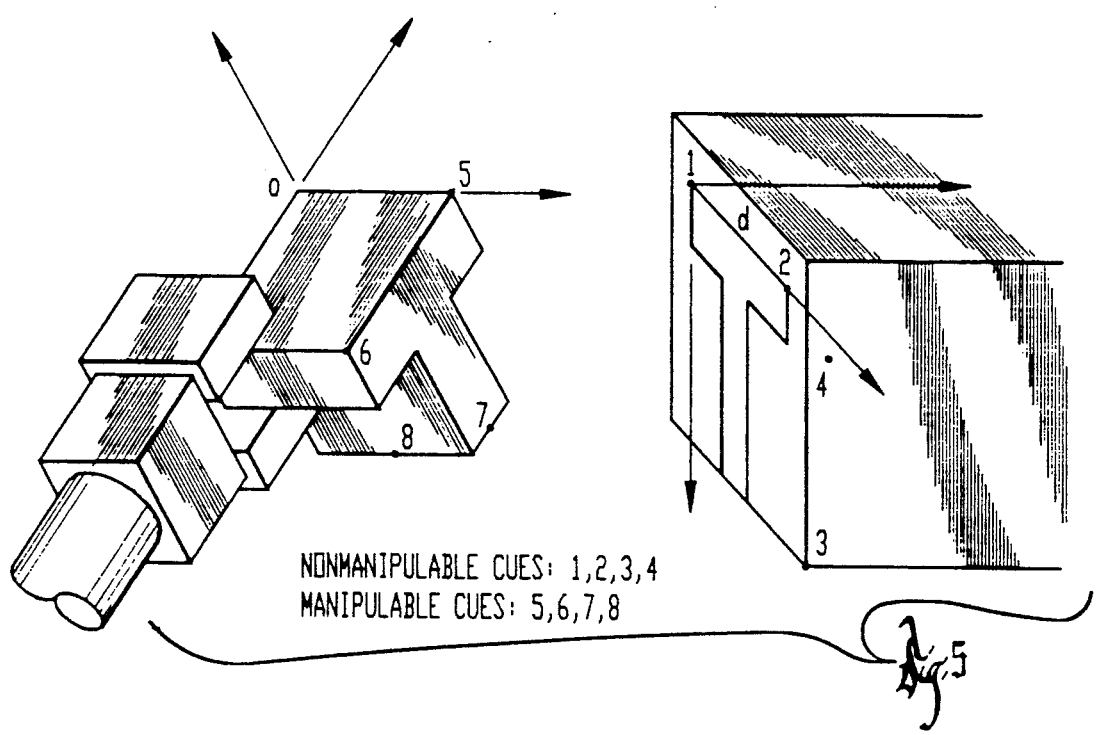
NONMANIPULABLE CUES: 1,2,3,4
MANIPULABLE CUES: 5,6,7,8

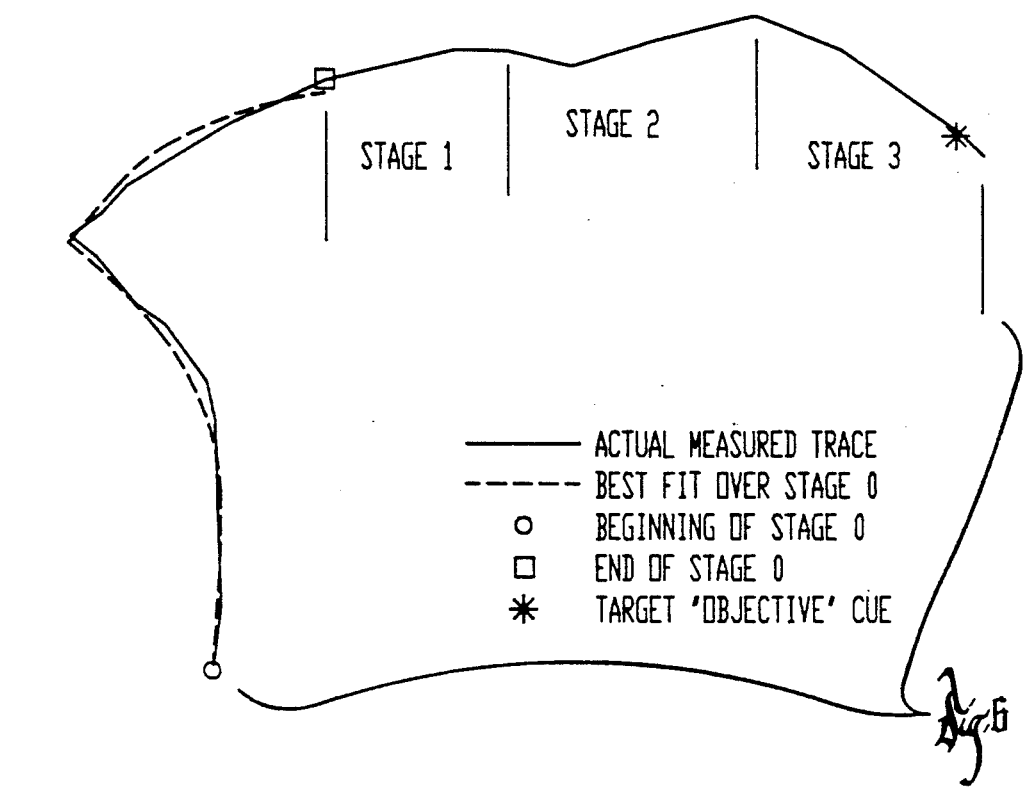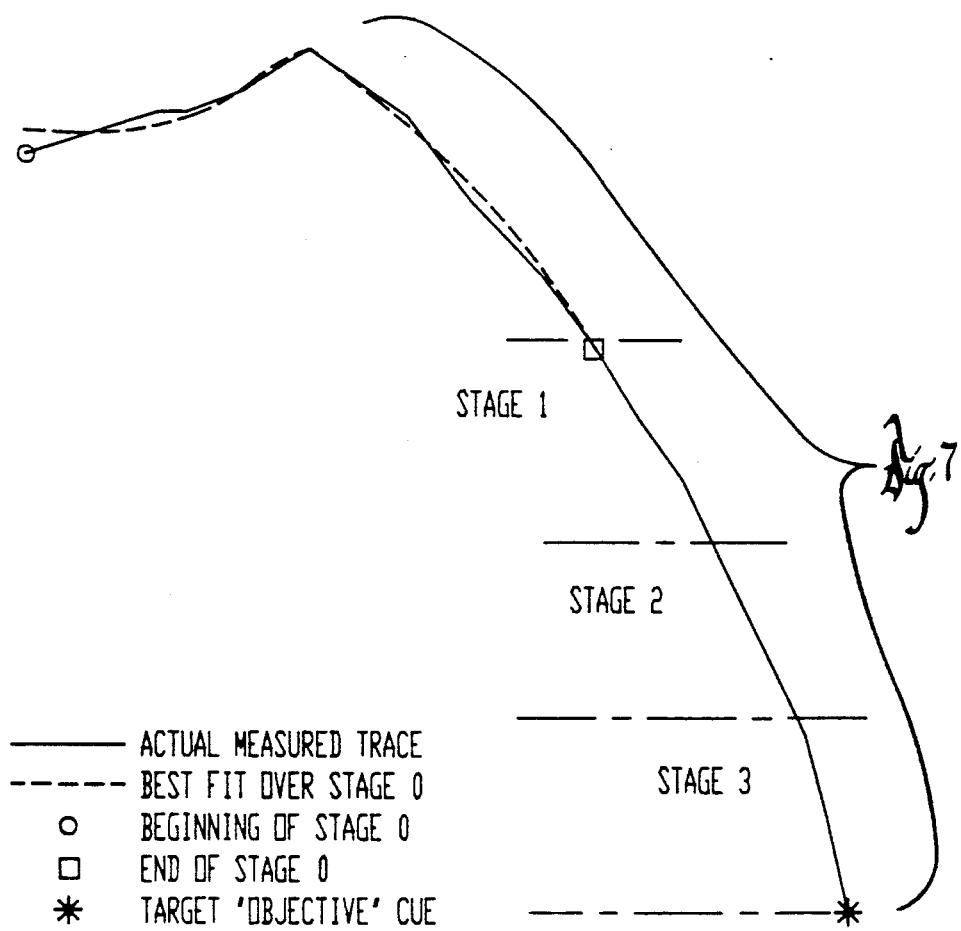

NONHOLONOMIC CAMERA SPACE MANIPULATION

GOVERNMENT RIGHTS

This invention was made with government support under government contract No. N00014-89-J-1533 award by the U.S. Office of Naval Research. The government has certain rights in the invention.

This is a continuation of copending application Ser. No. 07/922,183 filed on Jul. 30, 1992, now abandoned.

BACKGROUND OF THE INVENTION

1. Field of the Invention

The present invention relates to mechanized manipulators which can fully or partially autonomously operate to perform tasks without direct human control, and in particular, to nonholonomic manipulators which use computerized camera vision to control manipulator movement.

2. Problems in the Art

There are many tasks which by choice or necessity would be completed using basically a robot, instead of a human, or a human utilizing a directly controlled mechanical machine. Examples range from factory assembly line tasks where autonomous robotic manipulation could advantageously decrease labor costs, or eliminate the need for workers to be exposed to dangerous procedures or environments, or extreme procedures such as retrieving or performing some manipulation task outside of a space vessel or at extreme depths in the ocean.

Most mechanized manipulation tasks involve direct human control. For example, a forklift requires a driver to control the steering and movement of the vehicle across the floor, as well as control of the raising and lowering of the fork. Many robotic arms require a human to control movement and positioning of the arm as well as grasping by the arm by direct controls.

There have been a substantial number of attempts, however, of semiautonomous or autonomous manipulation. Many factories utilize preprogrammed robotic arms to complete repetitive tasks in fixed frames of reference. More recently attempts have been made to incorporate what will be called generically "computer vision" striving to allow the machine to detect and recognize items in its field of view and then to operate upon those items accordingly.

A serious shortcoming of all known computer-vision-type manipulation systems is that some sort of pre-known relationship, correlation, or calibration must be made between the major components of the system and the work space in which it operates. For example, U.S. Pat. No. 4,118,730 by inventor Lemelson, entitled "SCANNING APPARATUS AND METHOD" uses a digital camera to attempt to recognize patterns of objects coming into its field of view, and once recognized, allows a manipulator arm to pick them up. However, the entire system is constrained by the fact that the position of the camera, the position and operation of the manipulator arm, the physical response of an end-member to joint rotation, and the algebraic method for assessing the location of items being identified by the camera are all precalibrated. The basic relationships between all of the major components is therefore known and correlated so that the field of view of the camera is pre-calibrated to the actual physical position of the elements within the field of view. Placement accuracy is thereby directly limited by the accuracy of these calibrations.

Another example is U.S. Pat. No. 4,789,940 to Christian, entitled "METHOD AND APPARATUS FOR FILTERING REFLECTIONS FROM DIRECT IMAGES FOR MOBILE ROBOT NAVIGATION". This patent is representative of utilization of a camera to view an area and to keep track of mobile robots in that area so that their movement can be controlled by a control system. While the attempt here is at autonomous control of the robotic vehicles using a type of camera computer vision, a limitation is that the area of movement and the field of view of the camera are and must be carefully precalibrated. In other words, the camera is always in a predetermined known position, and in Christian the floor upon which the robots locomote is carefully calibrated. Movement is directed then in the two dimensional plane of the surface and is accomplished because of these pre-known conditions.

Another attempt places the video camera directly on the end of a robotic arm. Here again, there is an obvious known relationship between the camera and the manipulator end. Even with such a setup, no system is known which has complete autonomous operation, and additional problems of image analysis are incurred with the nonstationary camera.

In direct contrast, if, for example, an antenna on a space ship needed to be repositioned, and the antenna was out of view of the astronauts, to obviate the requirement for the astronauts to go outside the vehicle to accomplish the task, it would be beneficial to have a manipulator means which not only could be moved to any desired position and orientation, but also one which could detect and grasp the antenna on its own without the astronauts' control. This would truly be autonomous manipulation, and such a situation would be incompatible with the high degree of sustained calibration which is usually required when vision is used.

The underpinnings for a vision-based system which produces excellent precision without such calibration are contained in U.S. Pat. No. 4,833,383, by two of the same inventors as the present application and co-owned by the owner of the present application. In U.S. Pat. No. 4,833,383, the means and method for autonomous manipulation between a fixed base and a manipulation arm extending from the fixed base is set forth. While the invention claimed therein does not require that the base necessarily be fixed at all times, the achievement of autonomous manipulation is concerned with situations where the movement of the base does not participate in the actual maneuver of the system.

The patent therefore has a limitation that it covers camera space manipulation only of a certain type of robot, namely one where the internal rotations are algebraically related to the position and orientation of the end-member. This precludes its use with wheeled or "nonholonomic" robots. In other words, the system can control a robotic-type manipulator arm to grasp or position an object held by it with respect to a goal position either within its reach or one which comes within its reach. As can be understood, this limits the work space within which the arm may operate.

Because the manipulator arm of the U.S. Pat. No. 4,833,383 is fixed to the base, even the most complex combination of joints between its connection to the base and its outer effector end can generally be algebraically described; and the required movement of those joints to move the end effector to a desired position can likewise be algebraically predicted and described. This sort of relationship is called a holonomic relationship. No matter what direction or combination of joint movements is achieved, the arm can always be returned to an original starting position simply by returning to the original joint coordinates. This allows complete repeatability of movement. It also allows for algebraic description of such movement.

Holonomic relationships make the autonomous control problem somewhat simpler because finite movements are repeatable. If the manipulator base were on wheels, by contrast, the rotation of the drive wheels and the angle of the steering wheels could be monitored and recorded. Instead of having an algebraic relationship, the relationship between mobile base, manipulator arm and end effector, and a goal location would be differential in nature. The return to an initial rotational position of the drive and steer angle no longer guarantees return to the initial position. Rather, and in contrast with holonomic systems, the entire history of wheel rotation is important.

There is therefore a need to expand the ability of camera space manipulation such as disclosed in the U.S. Pat. No. 4,833,383 from holonomic relationships to nonholonomic relationships, or to the combination of holonomic and nonholonomic relationships. Additionally, there is a need to accomplish nonholonomic camera space manipulation while still retaining precision, accuracy and reliability along with generally "real time" functioning. The complexity of the relationships challenges real time functioning because of the sophisticated and more complex mathematical relationships which in turn would require additional processing time.

It is therefore a principal object of the present invention to provide a nonholonomic camera space manipulation means and method which solves or overcomes the problems and deficiencies in the art.

Another object of the present invention is to provide a means and method as above described which applies to nonholonomic, as well as holonomic relationships.

A still further object of the present invention is to provide a means and method as above described which provides autonomous operation.

A still further object of the present invention is to provide a means and method as above described which allows multiple-degree-of-freedom-of-movement for the manipulator.

Another object of the present invention is to provide a means and method as above described which is operable without calibration or pre-known relationships between any camera means, base means, and work object.

Another object of the present invention is to provide a means and method as above described which is relatively insensitive to imprecision regarding the mathematical models which describe the differential and algebraic kinematics of movement of the manipulator base or the on-board manipulator arm.

A still further object of the present invention is to provide a means and method as above described which does not require merging or direct comparison of fields of view of each camera means.

Still a further feature and advantage of the present invention is to provide a means and method as above described which achieves good real time processing and functioning.

Another object of the present invention is to provide a means and method as above described which is insensitive to visual obscuration of the work piece at or near completion of the manipulation task.

Another object of the present invention is to provide a means and method as above described which eliminates some redundant degrees of freedom of movement by exploiting the available nonholonomic degrees of freedom.

A still further object of the present invention is to provide a means and method as above described which is versatile, precise, reliable, and functions efficiently and quickly for a variety of tasks.

Another object of the present invention is to provide a means and method as above described which has increased utility and flexibility.

These and other objects, features, and advantages of the present invention will become more apparent with reference to the accompanying specification and claims.

SUMMARY OF THE INVENTION

The present invention is directed towards a means and method for autonomous operation of a manipulator having multiple degrees of freedom of movement. The manipulator includes a base which is mobile in a plurality of different directions, but is not calibrated to any grid or pre-known system. A manipulator arm associated with the base has a holonomic relationship with the base and includes an end effector and its outer free end to perform manipulation of items which grasp a work object. The movement of the base with respect to the work space or other objects is nonholonomic and can only be described using differential equations.

At least two cameras are utilized to view what will be called the work space or region which currently contains the work piece. It is to be understood that the cameras must at least intermittently have in their field of view the end effector means and a work object or target or goal location. There is also no correlation between the position and orientation of any of the cameras and the base or the work object. Thus cameras may be positioned independently to satisfy these requirements. The cameras can move or be repositioned from time to time during the manipulation task. Relative camera space locations of objects for two or more independent cameras are sufficient to establish their relative positions in the physical work space.

Cues are placed on at least the end effector and the work object or target location, and are observable by the camera means. These cues can take on many configurations but generally have the requirement that they can be distinguished from all else in the field of view of each camera. Thus, they can be of a certain shape and/or color which has a different intensity or contrast from all else in the cameras' field of view, or otherwise can be distinguished. Readily identifiable natural features on the work object or target location and on the manipulator may be used in place of artificial cues.

When an image is acquired the three-dimensional field of view of each camera is mapped into a focal plane (two-dimensional image) which will be called the "camera space" of each camera. Means associated with each camera detect and identify each cue means in its field of view. Each camera's image, from its unique perspective, then does have a two dimensional coordinate system whereby each identified cue can be located and identified.

The relative position between cues in the camera spaces can then be identified and quantified. A processing system, according to pre-programmed instructions, estimates what type of movement of the manipulator base and manipulator arm should take place to bring the camera images of the cues into the proper relative positions in each camera space. Thus, the termination or goal coordinates for the cue associated with the manipulator arm are set up and a plan is formulated to accomplish this goal.

Each camera space is reviewed and the processing, according to predetermined procedures, selects information from each camera space in making its estimations. Implementation of the plan is then started by movement of the manipulator base and/or arm. Measurements are taken of the relative changes this creates in the location of the cues in the camera spaces and sequential updates of planning of the movement of the base and/or arm are made in real time. In essence, once movement is started, the imperfectly known kinematics of the base and arm, which can be mathematically defined, are factored into a planned trajectory for the base and/or arm to meet the goal. Progress is monitored by watching the cues in camera space. As long as the cues and the information received by the measurements conform to the plan, the plan is left intact. However, if there is sufficient deviation, the plan is updated, the trajectory instructions for the base and/or arm are changed, and this is repeated continuously until the task is completed.

There is prior knowledge of the physical relationship between the base of the manipulator and its end effector, based on the manipulator arm and joints therebetween. There is also knowledge of the nominal kinematics of the manipulator arm and of the base.

The estimated aiding and planning incorporates algebraic and differential processing to resolve the complex and numerous relationships that occur as the system is moving.

Various options and features and alternatives are possible with respect to the invention.

BRIEF DESCRIPTION OF THE DRAWINGS

FIG. 1 is a perspective view of one embodiment of a manipulator according to the present invention.

FIG. 2 is a schematic diagram defining relationships associated with the manipulator of FIG. 1.

FIG. 3 is a simplified schematic view of an alternative embodiment of a manipulator arm including definitions of relationships between portions of the arm.

FIG. 4 is an alternative embodiment for a nonholonomic camera space manipulation system according to the present invention.

FIG. 5 is a partial perspective view illustrating components for a manipulation task according to the present invention.

FIGS. 6 and 7 are diagrammatic depictions of camera space results of manipulation according to the present invention.

DETAILED DESCRIPTION OF THE PREFERRED EMBODIMENT

A detailed description of the preferred embodiments of the present invention will now be set forth. This description is intended to assist in an understanding of the invention and is not intended nor does it limit the scope of the invention.

Reference will be taken to the accompanying drawings. Reference numerals will be utilized to identify certain parts or locations in the drawings. The same reference numerals will be used for the same parts or locations throughout the drawings unless otherwise indicated.

First a general overview of the preferred embodiments of the invention will be given. A detailed description of the embodiments will follow thereafter along with details of operation of the embodiments according to the invention. Actual examples of results of the invention will also be included.

The present invention advances over the applicants' previous U.S. Pat. No. 4,833,383 by extending the principles of camera space manipulation to a manipulator which not only has a manipulator arm or member which can be oriented in a variety of ways with respect to a base, but also where the manipulator includes a mobile steerable base. The complexity of the relationships is greatly increased over the U.S. Pat. No. 4,833,383. Basically, the system can now autonomously control a non-human operated forklift, such as is shown in FIG. 1, by selectively either moving just the forklift portion with respect to a goal position, or both the mobile base and forklift portion. In the U.S. Pat. No. 4,833,383, the concern was with moving a manipulator arm. The base could not be moved.

The starting point for a discussion of the preferred embodiments of the present invention is that many of the basic operations and equipment needed for the present invention are the same as set forth in the U.S. Pat. No. 4,833,383. That patent is therefore incorporated by reference. It explains how a camera's (or cameras') field(s) of view is (are) translated into a two-dimensional image plane "camera space" which is then transferred to a processor. It also describes in relation to its embodiments, how the processor can in turn send signals out to control the manipulator.

The present invention requires at least two cameras to accomplish three-dimensional objectives. It also requires the processor to be capable of dealing with the more complex relationships created by the mobile base. Therefore, the U.S. Pat. No. 4,833,383 should be referred to regarding background for these basic concepts. The enhancements of the present invention will now be discussed.

FIG. 1 shows in perspective a forklift 10 having a body 12 front wheels 14 (one of which is hidden) and a rear drive end steering wheel 16. A fork 18 is moveable vertically. A sensor point P is shown midway between fork tines 20 and 22.

As such, forklift 10 presents a manipulator having a holonomic relationship between fork 18 and body 12. Its position in relation to that of body 12 can be expressed as an algebraic function of one internal coordinate. On the other hand, body 12 forms a nonholonomic relationship between forklift 10 and its environment. There exists no permanent algebraic relationship between the internal (wheel rotation) coordinate and the physical position of the vehicle.

FIG. 2 describes the parameters of this nonholonomic relationship. The XY axis to the right of FIG. 2 describes the two dimensional framework of the surface upon which forklift 10, or any other manipulator would move. On the other hand, xy defines the coordinate system referred to as the current location of forklift 10. The axis defined by small x extends through point P whereas the axis y is perpendicular to x and extends through the rotational axis of steering wheel 16.

Distance b is the distance between y axis and the front axle between front wheels 14. Distance d is the distance between the y axis and a parallel line through point P.

The distance R represents the radius of steering wheel 16.

Angle $\theta_s$ defines the angular orientation of steering wheel 16 with respect to the x axis. Angle $\theta_d$ represents the angle in radians of rotation of steering wheel 16.

An additional parameter $\theta_l$ would allow a mathematical description of the up and down movement of fork 18 of forklift 10.

Because of the addition of nonholonomic degrees of freedom, the techniques disclosed in U.S. Pat. No. 4,833,383 must be modified. Angles $\theta_s$ (steering of steering wheel 16) and $\theta_d$ (driving of wheel 16) are directly controllable but are now no longer algebraically related to the position of the system.

It is to be again emphasized that in the present invention, the object is to move point P, which includes a visual cue and shall be discussed further, into a desired position with respect to a work object or goal location which also has a visual cue. It is important to understand that both visual cues need to be, at least intermittently, within the field of view of each participating camera. Therefore, the present system relating to FIG. 1 is limited to what would be called "short trip" applications based on this limitation of field of view. This does not preclude, however, the cameras also being mobile and controlled to move. There does not have to be any pre-known relationship between the cameras and the manipulator or the work object.

Without the nonholonomic degrees of freedom of forklift 10, the manipulator in U.S. Pat. No. 4,833,383 could be mathematically described in Cartesian space to define a cue on the end effector in the algebraic form:

$$X_r = r_x(\theta) \quad (1)$$
$$Y_r = r_y(\theta)$$
$$Z_r = r_z(\theta)$$

where $(X_r, Y_r, Z_r)$ gives the position of a particular manipulable cue relative to a specific, physical coordinate system.

Instead, to describe mathematically the response of Cartesian coordinates of forklift 10 with origin at point P to movement of the forklift's internal rotations the differential form must be used:

$$dX_p = R\left[\cos\theta_s \cos\phi + \left(\frac{d}{b} - 1\right)\sin\theta_s \sin\phi\right]d\theta_d \quad (2)$$

$$dY_p = R\left[-\cos\theta_s \sin\phi + \left(\frac{d}{b} - 1\right)\sin\theta_s \cos\phi\right]d\theta_d$$

$$dZ_p = C_1 d\theta_l$$

$$d\phi = -\frac{R}{b}(\sin\theta_s)d\theta_d$$

where the applicable system parameters are as described in FIG. 2, and where only the third of these, $dZ_p$, is integrable to the holonomic form.

$$Z_p = C_1 \theta_l + C_2 \quad (3)$$

The coordinate $\theta_l$, therefore, is of a type which is referred to here as a "holonomic degree of freedom".

A model must now be developed to relate the directly-controllable system coordinates, $\theta_d$, $\theta_s$, $\theta_l$, to the appearance in each two-dimensional "camera space" of the manipulable cue. This is illustrated initially for an all-holonomic system and subsequently extended to the holonomic systems of interest here.

If $(X_c, Y_c)$ denotes the camera-space position of a "manipulable cue" centroid, then the following model is used to map nominal physical position of the centroid into its camera-space position:

$$X_c = (C_1^2 + C_2^2 - C_3^2 - C_4^2)r_x(\theta) + \quad (4)$$
$$2(C_2C_3 + C_1C_4)r_y(\theta) + 2(C_2C_4 - C_1C_3)r_z(\theta) + C_5 \equiv f_x(\theta;C)$$

$$Y_c = 2(C_2C_3 - C_1C_4)r_x(\theta) + \quad (5)$$
$$(C_1^2 - C_2^2 + C_3^2 - C_4^2)r_y(\theta) + 2(C_3C_4 + C_1C_2)r_z(\theta) +$$
$$C_6 \equiv f_y(\theta;C)$$

The camera space model of equations 4 and 5 is a simplified orthographic model based on Euler parameters, see for example, H. Morton, J. L. Junkins, and J. Blanton, "Analytical Solutions for Euler Parameters", *Celestial Mechanics*, Dordrecht, Holland: Reidel, Vol. 10, 1974. It does not deal with certain complicating factors. For example, it avoids dealing with distortion in the camera due to non-parallel light rays. It has been found, however, that this can be overcome by the invention. It allows the invention to be simpler.

FIG. 3 shows a manipulator arm 30 having more degrees of freedom of movement than the fork 18 of FIG. 1. It has an end effector grip 32 holding an object 34 which includes a cue 36. A pivotal mount 38, pivotable about the Y axis defined by angle $\theta_3$ would be connectable to a base means. A first articulatable arm 40 would extend from a joint 42 to a joint 44. Second articulatable arm 46 would extend from joint 44 to end effector grip 32. Arm 40 would have a length $L_1$ and move through an angle $\theta_1$. Arm 46 would have a length $L_2$ and move through an angle $\theta_2$. This simple configuration would allow cue 36 to be positioned anywhere in the manipulator's physical work space by driving arm 30 according to three joint coordinates $[\theta_1, \theta_2, \theta_3]^T \equiv \theta$.

The parameters C are estimated using video and joint-rotation samples as disclosed in U.S. Pat. No. 4,833,383. If it is assumed that two or more cameras are present, (m greater than or equal to 2), and that $\theta^*$ is a vector whose elements are the terminal joint coordinates of the manipulator and the position of its base, then J in the following equation needs to be minimized to achieve the goal:

$$J = \sum_{i=1}^{m} \{[X_c^i - f_x(\theta^*;C^i)]^2 + [Y_c^i - f_y(\theta^*;C^i)]^2\} \quad (6)$$

where $(X_c^i, Y_c^i)$ are the camera-space coordinates of the stationary target cue as measured in the reference frame of the $i^{th}$ camera. It is important to understand that the terminal joint coordinate vector given by $\theta^*$ is updated sequentially with improved $C^i$ estimates as the manipulator is maneuvered.

The vectos $C^i$ are the uncertainty-of-view parameters which describe the relationship between the cameras and the base of the manipulator.

It is to be understood that in the present invention, two or more cameras are used and therefore two or more camera space evaluations are proceeding at the same time. However, the two or more camera spaces are not merged or otherwise compiled in the preferred embodiment. Rather, instructions as to movement of the manipulator are made by taking at each particular juncture those joint coordinate instructions which minimize J as described above.

This minimization process, already disclosed for the holonomic case in U.S. Pat. No. 4,833,383, proceeds as follows.

If C in equations 4 and 5 are denoted by $C_j$, j equal 1, 2, ... 6; once a sufficiently large number of cue and simultaneous joint coordinate measurements have been made at instances of time that are denoted by $t_1, t_2, \ldots, t_k$ a parameter correction vector $\Delta C$ is computed as follows:

$$\Delta C = (A^T W A)^{-1} A^T W R \quad (7)$$

where the 2k elements of the vector of residuals R are given by $$R_{2i-1} = X_c(t_i) - f_x(\theta_1(t_i), \ldots, \theta_3(t_i); C_1, \ldots, C_m) \quad (8)$$
$$R_{2i} = Y_c(t_i) - f_y(\theta_1(t_i), \ldots, \theta_3(t_i); C_1, \ldots, C_m) \quad (9)$$
$$i = 1, 2, \ldots, k$$

where $(X_c(t_i), Y_c(t_i))$ are the camera-space cue location measurements (for the camera of interest) at $t=t_i$, and where $\theta_1(t_i), \theta_2(t_i), \theta_3(t_i)$ are the corresponding holonomic manipulator joint coordinates.

The $2k \times$ matrix A has elements given by $$A_{(2j-1,i)} = \frac{\partial f_x}{\partial C_i}(\theta_1(t_j), \ldots, \theta_3(t_j); C_1, \ldots, C_m) \quad (10)$$

$$A_{(2j,i)} = \frac{\partial f_y}{\partial C_i}(\theta_1(t_j), \ldots, \theta_3(t_j); C_1, \ldots, C_m) \quad (11)$$

where $C_1$ through $C_m$ represent current estimates of the parameters.

A combination of manipulator arm 30 of FIG. 3 and a mobile base such as shown in FIG. 1 would require the following changes to the above-discussed mathematical analysis.

The six uncertainty of view parameters $C_1$ through $C_6$ which nominally describe the spatial relationship between camera and manipulator base are no longer nominally stationary. They will change with changes in the mobile base coordinates.

A best estimate of the current (or future) values of $C_1$ through $C_6$ must be made. A mathematical model relating changes in C to movement of the base takes the form of six first-order differential equations with $C_1$-$C_6$ serving as the dependent variables, and the drive angle $\theta_d$ serving as the independent variable. These equations basically take the form of equations 4 and 5 with the $\theta$ vector now representing only those degrees of freedom which are holonomic.

Before trajectory planning and updating can occur, however, it is necessary to convert a sequence of camera measurements of moving cues into a current best estimate of current (or future) values of $C_1$ through $C_6$. Toward this end, the following set of different equations was derived:

$$dC_1/d\theta_d = -f_1(\theta_s) C_4/2 = g_1(C, \theta_s) \quad (12)$$
$$dC_2/d\theta_d = -f_1(\theta_s) C_3/2 = g_2(C, \theta_s)$$
$$dC_3/d\theta_d = +f_1(\theta_s) C_2/2 = g_3(C, \theta_s)$$
$$dC_4/d\theta_d = +f_1(\theta_s) C_1/2 = g_4(C, \theta_s)$$
$$dC_5/d\theta_d = (C_1^2 + C_2^2 - C_3^2 - C_4^2) f_2(\theta_s) +$$
$$\qquad 2(C_2 C_3 + C_1 C_4) f_3(\theta_s) = g_5(C, \theta_s)$$
$$dC_6/d\theta_d = 2(C_2 C_3 - C_1 C_4) f_2(\theta_s) +$$
$$\qquad (C_1^2 - C_2^2 + C_3^2 - C_4^2) f_3(\theta_s) = g_6(C, \theta_s)$$

where $$f_1(\theta_s) = -\frac{R}{b} \sin \theta_s \quad (13)$$
$$f_2(\theta_s) = +R \cos \theta_s$$
$$f_3(\theta_s) = -R \sin \theta_s$$

The first four of Eqs. (12) are linear in C and the remaining two are nonlinear. Nonetheless, it is interesting and useful to know that, if the steering angle $\theta_s$ remains constant, Eqs. (12) are easily solved in closed form. It is also interesting to note that the "state" equations (Eqs. (12)) and the "observation" equations (Eqs. (4,5)) are in the standard form.

$$x = g(x, u) \quad (14)$$
$$y = p(x)$$

provided we identify $\theta_d$ with the independent variable t, C with the vector of dependent variables x and $\theta_s$ with the control u, and provided we let the vector y represent the camera space coordinates of observed cues. The form of Eqs. (14) is a standard one for estimation.

The actual derivation of Eqs. (12) is somewhat long. It assumes the same very simple camera model that was described earlier. The consequent error in the differential equation model of Eqs. (12) results in the possibility of the need for a reasonably high frequency of measurements and skewness of measurement weighting in order to ensure usefully accurate C estimates, particularly as the maneuver nears the terminal position. The likelihood of wheel slip and/or a nonuniform surface reinforces this need.

The validity of Eqs. (12) has been verified using some simple procedures which involve an integration of the equations along a nominal joint rotation trajectory, and a comparison of various intermediate (integrated) C vectors with their corresponding value based on the "known" sequence of physical positions and projections, into a stationary (hypothetical) camera of cues moving with the mobile base (making use all along of the simple camera model).

It is desired to acquire an updated estimate of C at a particular value of $\theta_d = \theta_d^*$ (which will likely be a near-future value of $\theta_d$ in order to allow for the computation time needed to perform updated estimates and trajectory plans while the maneuver is allowed to continue). The estimation process parallels that for holonomic systems (Eqs. 7-11) as follows.

First, an earlier estimate of C is integrated forward using Eqs. (12), from the previous, to the new, $\theta_d^*$, using measured $\theta_s(\theta_d)$ histories when available and planned $\theta_s(\theta_d)$ trajectories otherwise. (Often, a combination of the two would be needed—measured $\theta_s(\theta_d)$ sequences up until the last available measurement, and planned $\theta_s(\theta_d)$ sequences between this point and the new $\theta_d^*$ of interest.) We let these initial best-estimates of $C(\theta_d^*)$ be denoted by $$C(\theta_d^*) = C^* \quad (15)$$

The next step is to improve on $C^*$ by adding to it a correction $\Delta C^*$ based on all available measurements. The correction vector $\Delta C^*$ is calculated from Eq. (7) as before, (repeated here as Eq. (16)).

$$\Delta C^* = (A^T W A)^{-1} A^T W R \quad (16)$$

The vector of residuals R in this case, however, will require a backward integration of Eqs. (12) from the current estimate of $C^* = C(\theta_d^*)$ to the points $\theta_d(t_i)$ at which measurements were acquired. Thus, Eqs. (8, 9) are modified to have the form $$R_{2i-1} = X_c(t_i) - f_x(\theta_h(t_i); C(\theta_d(t_i))) \quad (17)$$

$$R_{2i} = Y_c(t_i) - f_y(\theta_h(t_i); C(\theta_d(t_i))) \quad (18)$$

where $\theta_d(t_i)$ is the value of the drive angle at the instant, $t_i$, at which a camera-space measurement $(X_c, Y_c)$ of interest is made, where $\theta_h(t_i)$ are the corresponding holonomic joint coordinates, and where $C(\theta_d(t_i))$ are the backward-integrated parameter values (from $\theta_d^*$ to $\theta_d(t_i)$) using Eqs. (12). The functions $f_x$ and $f_y$ retain their earlier definitions of Eqs. (4, 5).

The matrix A of Eq. (16) is also modified to accommodate nonholonomic degrees of freedom. Elements of A now become:

$$A_{(2j-1,i)} = \frac{\partial f_x(t_i)}{\partial C_i} \quad (19)$$

$$A_{(2j,i)} = \frac{\partial f_y(t_i)}{\partial C_i} \quad (20)$$

where the partial derivatives with respect to $C_i^* = -C_i(\theta_d^*)$ require a numerical backward integration of additional quantities as follows.

The partial derivatives of Eqs. (19) can be expressed using the chain rule as $$\frac{\partial f(t_i)}{\partial C_i} = \sum_{l=1}^{6} \frac{\partial f(t_i)}{\partial C_l(t_j)} \frac{\partial C_l(t_i)}{\partial C_i} \quad (20)$$

Denoting $\Phi_{li}(t_j) \equiv \partial C_l(t_j)/\partial C_i$ the equations which must be backward integrated from $\theta_d$ to $\theta_d(t_j)$ in order to produce $\Phi_{li}(t_j)$ and hence A are [11]

$$\frac{d\Phi_{li}}{d\theta_d} = \sum_{k=1}^{6} F_{lk} \Phi_{ki} \quad (21)$$

where
$$F_{lk} = \partial g_l/\partial C_k \quad (22)$$
and $$\Phi_{li}\bigg|_{\theta_d^*} = \begin{cases} 1 & l = i \\ 0 & \text{otherwise} \end{cases} \quad (23)$$

Once C* has been corrected, a subsequent backward integration of Eqs. (12) may be performed, and a new correction made using a repeat of Eqs. (16–23).

Upon satisfactory convergence, a trajectory modification is calculated beginning from $\theta_d^*$. This modified trajectory plan consists of two parts: the part involving the holonomic degrees of freedom, $\theta_n$, and the part involving the nonholonomic degrees of freedom, the function $\theta_s(\theta_d)$. We limit our goal to the achievement of the desired terminal position/orientation of the end member, and hence we are concerned with finding the terminal values of $\theta_n$. (If required, intermediate objectives may be achieved as well using the same approach.) As already noted, however, the entire trajectory for $\theta_s(\theta_d)$ is influential in arriving at the correct terminal end-effector position. The camera-space objectives are no different, of course, for nonholonomic or holonomic systems. The problem is how to exercise the available degrees of freedom in order to realize those objectives.

The updated trajectory plan is applied to the interval between $\theta_d = \theta_d^*$ and the termination of the maneuver.

We let the coordinates $x^*$, $y^*$, and $\phi^*$ represent the desired position and in-plane orientation of the base with respect to its position and base orientation at $\theta_d = \theta_d^*$. In terms of $x^*$, $y^*$, $\phi^*$, and $\theta_h$, an algebraic expression describing the physical cue position, similar to the nominal (holonomic) kinematics model of Eqs. (1), can be identified as $$\begin{aligned} X_r &= x^* + r_x(\theta_h)\cos\phi^* + r_y(\theta_h)\sin\phi^* \\ Y_r &= y^* - r_x(\theta_h)\sin\phi^* + r_y(\theta_h)\cos\phi^* \\ Z_r &= r_z(\theta_h) \end{aligned} \quad (24)$$

where $X_r$, $Y_r$, $Z_r$ are the nominal physical coordinates of a cue of interest with respect to the coordinate system that is attached to the mobile base at the point where $\theta_d = \theta_d^*$. The functions $r_x(\theta_h)$, $r_y(\theta_h)$, $r_z(\theta_h)$, describe the nominal physical position of the same cue, but this time with respect to the coordinate system that is attached to the mobile base at the current instant. (Note therefore that if $x^* = y^* = \Phi^* = 0$, then $X_r = r_x(\theta_h)$, etc.)

If the vector $\theta$ is now defined to include all elements of $\theta_h$ as well as $x^*$, $y^*$, $\Phi^*$, then we may regard $X_r = X_r(\theta)$, $Y_r = Y_r(\theta)$, and $Z_r = Z_r(\theta)$, and the approach outlined near Eq. (6) may be used to solve for current estimates of the required terminal vales of $\theta_h$ as well as $x^*$, $y^*$, $\phi^*$.

It remains to resolve the trajectory plan for $\theta_s(\theta_d)$ which will transition the base from $x^* = y^* = \phi^* = 0$, to the desired $x^*$, $y^*$, and $\phi^*$ as determined using the approach which is outlined above. A simple approach for accomplishing this is outlined in the next section.

The nonlinearity of the six state equations make the formulation unsuitable for the application of a Kalman filter, so the more computationally intensive "batch" estimation combined with numerical integration of the state equations is used instead. (See e.g. J. L. Junkins, *An Introduction to Optimal Estimation of Dynamical Systems*, Alphen AanDenRijn, Sijthoff and Noordhoff, pp. 29–33, 1978.)

Once estimates for $C_1$ through $C_6$ are determined (or updated), the trajectory plan for the wheels of the mobile base (or their updates) must be determined. To superimpose the manipulable and nonmanipulable cues in each camera space can be a goal, in one example. It is noted that there are an infinite number of wheel trajectories which will result in any given realizable set of camera-space cue configurations. There are several possible ways to resolve uniquely the trajectory plan.

It can therefore be seen that the present invention requires a processing of these mathematical models and equations based on the camera space identification of cues to in turn create signals which are sent to the manipulator to control its movement.

It is important to note that the 3-axis all-holonomic manipulator, referenced earlier, is not a nonholonomic system.

FIG. 4 depicts an alternative embodiment of a nonholonomic system 50, which in this case is a HERO 1 Robot Model ET-18. Cameras 52 and 54 are positioned so that manipulator 50 is within their fields of view. A control processing unit 56 is schematically indicated in FIG. 4. Also, it is pointed out that each of manipulator 50, cameras 52 and 54, and control processing unit 56 have communication means known within the art to allow communication therebetween.

As with forklift 10 of FIG. 1, manipulator 50 has two front wheels 58 and 60 and a rear drive steer wheel 62. $\theta_s$ and $\theta_d$ define steering angle and rotation respectively in radians. In this embodiment wheel 62 has a radius R equal to 2.467 inches, the distance b between the front axle of front wheels 58 and 60, and a parallel line through center of wheel 62 is 6.688 inches, whereas the same distance from that parallel line through the center of rear wheel 62 to point P at end effector 64 of manipulator arm 66 is 15.750 inches.

Manipulator arm 66 in FIG. 4 simply has a rotatable arm 68 extending from body 70, and a perpendicular arm 72 connected to its end. End effector 64 is at one end of arm 72 which can be rotated around an angle $\theta_h$. Additionally end effector 64 could be self rotated around an axis but will not be so described in this embodiment.

The distance from the pivot axis of the arm and joint to cue P is 10.8 inches. Rotation about the pivot axis of the arm joint represents the only holonomic degree of freedom used in this embodiment.

The kinematics model of equation 2 is modified for manipulator 50 to the following differential form:

$$dX_p = R[\cos\theta_s \cos\phi + (d/b - 1)\sin\theta_s \sin\phi]d\theta_d \quad (25)$$
$$dY_p = R[-\cos\theta_s \sin\phi + (d/b - 1)\sin\theta_s \cos\phi]d\theta_d + l\cos\theta_h d\theta_h$$
$$dZ_p = -l\sin\theta_h d\theta_h$$
$$d\phi = -(R/b)\sin\theta_s d\theta_d$$

The third of these, $dZ_p$, is integrable to $$Z_p = l\cos\theta_h - h \quad (26)$$

where h is the vertical distance from the pivot axis of the arm joint to the center of the drive/steering wheel and is equal to 13.16 inches. The holonomic coordinate, $\theta_h$, is measured as indicated in FIG. 4.

In operation, the next step is to estimate what type of movement is required to move point P to a point indicated diagrammatically as point Q in FIG. 4. First, control processing unit 56 begins movement of manipulator 50. Once a number of camera space measurements of point P are made by cameras 52 and 54, the C parameters are updated as described in equations 16–23. J is minimized as defined in equation 6 to solve for the current estimates of the terminal values of $\theta_h$ as well as $X'$ and $Y'$ representing current best-estimates of the desired terminal position of the base with respect to its position at $\theta_d = \theta_d^*$.

The control processing unit 56 therefore instructs manipulator 50 to operate its steering/drive wheel 62 and manipulator arm 66 to drive point P towards point Q in the interval between $\theta_d = \theta_d^*$ and the termination of the maneuver.

It is noted that in this procedure of simply superimposing points P and Q, the manipulator 50 can do so in several different terminal positions ($x^*, y^*, \phi^*$). Also, an infinite number of wheel trajectories could be found which would satisfy terminal requirements for any given ($x^*, y^*, \phi^*$) combination.

Table 1 shows a typical experimental recordation of a number of measurements for manipulator 50 for the cue points P and Q.

TABLE 1

| | Joint Coordinate Data (actual system inputs) | | | |
|---|---|---|---|---|
| stage number | number of vision measurements acquired | $\theta_d$ radians* | $\theta_s$ rad. | $\theta_h$ radians |
| 0 | 6 | 0.0–2.1 | .33 | .45 |
| 0 | 6 | 2.1–4.2 | .33 | .45–.68 |
| 0 | 6 | 4.2–6.3 | −.66 | .68–.92 |
| 1 | 3 | 6.3–7.3 | −.51 | .92–1.0 |
| 2 | 3 | 7.3–8.4 | −.58 | 1.0–1.1 |
| 3 | 3 | 8.4–9.3 | −.66 | 1.1–1.15 |

*measured from the beginning of stage 0.

This corresponds with the diagrammatical depiction of the actual trace of point P with regard to point Q in camera space in FIGS. 6 and 7. Table 1 represents the recorded sequence of arm and wheel movement associated with stage 0. At the end of stage 0, the C parameters are initially established for both cameras and the initial fit from cameras 52 and 54. These updated parameters along with camera space coordinates for target cue Q are used as described in the previous section to determine future trajectory plans for angle $\theta_d$, $\theta_s$, and $\theta_h$. This procedure is repeated three times based on the acquisition of new data once at the end of stage 0, once at the end of stage 1, and once at the end of stage 2 as shown in FIGS. 6 and 7. Table 2 shows these numbers at the end of each stage.

TABLE 2

| | Trajectory Plan Updates | | |
|---|---|---|---|
| stage number | $\theta_d$ rad.* | $\theta_s$ rad. | $\theta_h$ rad. |
| 1 | 3.4 | −.51 | 1.02 |
| 2 | 2.1 | −.58 | 1.07 |
| 3 | 0.9 | −.64 | 1.13 |

*measured from endpoint of previous stage to projected maneuver termination.

FIG. 5 illustrates a still further problem which can be overcome with the present invention. In a more difficult maneuver, instead of superposition of one point to a target point, it is sometimes desired to do three-dimensional rigid body positioning tasks, i.e., tasks that require both correct position and correct orientation of an object in the grasp of the end effector. This implies as a camera-space objective a specific relationship between manipulable and nonmanipulable cues. For example in FIG. 5, this would include the task of matably inserting the T-shaped member into the T-shaped slot. The manipulator arm is shown holding the T-shaped member. This is called rigid body positioning and requires that both the base position and orientation must be controlled. The following set of equations would be used:

$$dx^*/d\theta_d = \quad (27)$$
$$R\left[\cos\theta_s \cos\phi^* + \left(\frac{d}{b} - 1\right)\sin\theta_s \sin\phi^*\right] = h_x(\phi^*, \theta_s)$$

$$dy^*/d\theta_d =$$
$$R\left[-\cos\theta_s \sin\phi^* + \left(\frac{d}{b} - 1\right)\sin\theta_s \cos\phi^*\right] = h_y(\phi^*, \theta_s)$$

$$d\phi^*/d\theta_d = -\frac{R}{b}(\sin\theta_s) = h_\phi(\theta_s)$$

Any number of schemes may be devised to bring about base motion transition from $x^*=y^*=\phi^*=0$ to the current estimate of the required values of these quantities, using nominal kinematics.

It will be appreciated that the present invention can take many forms and embodiments. The true essence and spirit of this invention are defined in the appended claims, and it is not intended that the embodiment of the invention presented herein should limit the scope thereof.

What is claimed is:

1. A camera space manipulation means comprising:
 a multiple degree of freedom of movement manipulator means including:
  a base means,
  an end effector means,
  connection means between the base means and the end effector means allowing multiple degrees of freedom of movement of the end effector means with respect to the base means based on known nominal kinematics, and including first sensing means for producing signals correlated to the orientation of the connection means relative to the base means,
  motive means associated with the base means for allowing locomotion of the base means in a plurality of degrees of freedom of movement and including second sensing means for producing signals correlated to the distance and direction of movement of the base means along a surface;
 first cue means associated with the end effector means;
 second cue means associated with a work object;
 two or more camera means each having a field of view being positionable to capture at least intermittently both the first and second cue means in a field of view, each camera means without a pre-known positional relationship to the base means, end effector means, connection means or motive means;
 camera space means associated with each camera means to convert the field of view of each camera means into a corresponding two dimensional camera space; and
 processing means including:
  distinguishing means to distinguish the first and second cue means from generally all other contents of the camera spaces,
  tracking means to obtain and store information relating to position and movement of the cue means in the camera spaces, monitoring means to obtain and store information relating to holonomic orientation and position of the connection means relative to the base means from the first sensing means, and nonholonomic history of movement of the base means from the second sensing means;
  estimation and planning means to repetitively propose a plan of movement for one or both of the connection means and motive means to bring about a desired positional relationship between the first and second cue means in the camera spaces, the plan being based on information in the tracking means and monitoring means taking into consideration both holonomic and nonholonomic relationships,
  control means for instructing movements of one or both of the connection and motive means to follow the plan in physical space.

2. The means of claim 1 wherein the base means comprises means for allowing mobility over a surface.

3. The means of claim 1 wherein the base means comprises means for allowing three-dimensional motion or orientation.

4. The means of claim 2 wherein the means for allowing mobility over a surface comprises wheel means.

5. The means of claim 4 wherein the wheel means comprises a plurality of wheels and one or more wheels can be independently driven and one or more wheels can be independently steered.

6. The means of claim 5 wherein at least one wheel is a steerable wheel and a drive wheel.

7. The means of claim 1 wherein the end effector means comprises a grasping means.

8. The means of claim 1 wherein the connection means includes joints and arm segments between the base means and the end effector means.

9. The means of claim 1 wherein the motive means includes a drive motor and a steering motor.

10. The means of claim 1 wherein the motive means includes one or more drive motors and one or more steering motors.

11. The means of claim 1 wherein the visual cue means include a property allowing the visual cue means to be visually distinguishable in camera space.

12. The means of claim 1 wherein the camera means comprises a video camera with image-digitization capability.

13. The means of claim 1 wherein the distinguishing means comprises a contrast detection means.

14. The means of claim 1 wherein the distinguishing means comprises a color differentiation means.

15. The means of claim 1 wherein the distinguishing means comprises a shape differentiation means.

16. The means of claim 1 wherein the distinguishing means comprises a feature differentiation means.

17. The means of claim 1 wherein the tracking means includes a memory means to store a record of position of the first and second cue means.

18. The means of claim 1 wherein the estimation and planning means includes a computer means.

19. The means of claim 1 wherein the control means includes a computer means.

20. The method of nonholonomic camera space manipulation for autonomous manipulation of a multiple-degree-of-freedom manipulator including a base which is mobile across a surface or in three dimensions, a manipulator arm which is manipulable in a plurality of degrees of freedom of movement from the base, and an end effector means at the outer free end of the manipulator arm, comprising:
 positioning a visual cue means on at least the end effector means and on a work object means;
 positioning two or more camera means so that each field of view of the camera means captures, at least intermittently, the first and second cue means;
 communicating the camera means to a control means where the fields of view are digitized and represent two dimensional camera space image planes of the fields of view;
 identifying the visual cues in the camera spaces; estimating movement of the base, manipulator arm, and the end effector means to effect bringing the visual cue means into a desired orientation in each camera space where the estimated movement is based on camera space relationships and on holonomic and nonholonomic considerations related to movement of the manipulator arm, end effector means, and base;

instructing movement of the manipulator arm and base to follow the estimated movement;

monitoring movement of the cues in the camera spaces, holonomic movement of the manipulator arm and end effector, and nonholonomic movement history of the base; and sequentially updating the estimated movement and instructions based on changes in position in the camera spaces between the visual cues and on the monitoring of movement of cues, manipulator arm, and base to effectuate a desired orientation of cues in the camera spaces and a desired orientation of end effector, manipulator arm, and base in physical space.

21. The method of claim 20 further comprising some holonomic movement of the manipulator arm.

22. The method of claim 20 wherein one visual cue means is placed on the end effector means.

23. The method of claim 20 wherein a visual cue means is placed on an object held by the end effector means.

24. The method of claim 20 wherein the visual cue means comprise one or more visual cue elements.

25. The method of claim 20 wherein the visual cue means comprise a combination of visual cue elements and natural features of the manipulator and work objects.

26. The method of claim 20 wherein the camera means includes means to adjust the camera means.

27. The method of claim 26 wherein the means to adjust the camera means include one or more of servoable zoom means for adjusting the field of view and closeness of view of the camera means, and servoable repositioning means for moving the position and orientation of the camera means.

28. The method of claim 20 wherein the visual cue means are identified from one another in each field of view.

29. The method of claim 20 further comprising computing parameters for movement to arrive at estimates of how the manipulator means associated with one visual cue means should be moved with respect to the other visual cue means on the work object means.

30. The method of claim 20 comprising the further step of defining admissible configurations in camera space for the two visual cue means.

31. The method of claim 20 further comprising defining termination coordinates in camera space for the visual cue means.

32. The method of claim 20 further comprising computing uncertainty of view variables.

33. The method of claim 32 wherein computing uncertainty of view variables involves one or more of the set consisting of algebraic and differential kinematics.

34. The method of claim 20 further comprising creating a mathematical model of movement of the manipulator means.

35. The method of claim 20 further comprising defining termination coordinates for the position of visual cue means with respect to one another.

36. The method of claim 20 further comprising defining orientation of the manipulator means with respect to the work object at a termination position.

37. The method of claim 20 further comprising sequentially updating the estimations in time.

38. The method of claim 20 comprising both holonomic and nonholonomic manipulation.

39. A camera space manipulation control means, utilizing two or more camera means for engaging an end effector means with a work object where there is not required any known prior three-dimensional physical space relationship between the end effector means, the work object, and the camera means, or between physical space and the two dimensional images at image planes, denoted as camera spaces, of the camera means comprising:

an articulateable manipulator means of known nominal kinematics in physical space extending from a mobile base to an outward end for movement of the outward end in a predefined physical work space in the physical space relative to the mobile base, which has a nonholonomic kinematic relationship between wheel rotation and base-position response, the manipulator means including a motor means for articulating the manipulator means in said physical space, the mobile base having a motor means and a steering means to locomote the mobile base in any direction over a surface or in three dimensions, and means for producing a signal identifying an approximate position and orientation of the manipulator means with respect only to the base, wherein the kinematic description of the manipulator means with base being known and the kinematic description of the mobile base being known only relative to prior movement;

each camera means being positionable in physical space without any previously know relation and correlation to the manipulator means except that each camera means must be oriented towards at least the end effector means and the work object for providing camera vision at least intermittently of the end effector means and the work object in camera space;

first visual cue means associated with the end effector means;

second visual cue means associated with the work object, the first and second visual cue means comprising means which are distinct and identifiable in said camera spaces from the remainder of the camera space manipulation control means in any surrounding environment, the first and second visual cue means providing descriptions of three dimensional physical space maneuver objectives as admissible configurations of visual cue means in the two dimensional camera spaces of the camera means; and a control means operatively connected to the manipulator means and the camera means, the control means including computing means for receiving the signal from the manipulator means and identifying the approximate position and orientation of the manipulator means with respect to the base means through the use of previously known kinematics, and signal processing means which identifies and tracks the visual cue means in the camera spaces to convert such into two dimensional camera space cue position signals, the manipulator approximate position and orientation signal and the camera space cue position signals being used in the control means to estimate the relationship between the position and orientation of the manipulator means and the location in each camera space of the visual cue means placed on the manipulator means, and using the current estimations of these relationships selecting required movement and orientation of the manipulator means which will bring about admissible configurations of the visual cue means in each camera space to insure successful engagement of the object in physical space, and to control orientation of the manipulator means in physical space according to selective movement and orientation commands resulting from the estimated relationship.

40. A method of camera space manipulation utilizing at least two camera means for engaging an articulatable manipulator means with an object where there is not required any known prior three dimensional physical space relationship between the manipulator means and the object, the camera means, and between physical space in a two dimensional image at the focal plane of the camera means, denoted as camera space, comprising the steps:

orienting each camera means to view the manipulator means which has an arm extending from a base to an outward end which is moveable in physical work space with known nominal kinematics relative to the base;

the manipulator means including a motor means which articulates the manipulator means in said physical work space, and means for producing a signal identifying the approximate position and orientation of the manipulator means with respect only to the base in said physical work space;

the base having motor and steering means for moving the base in any direction along a surface and including means for producing a signal identifying the approximate position and orientation of the base with respect only to its prior positions, each camera means being positioned and oriented in physical space without any previously known relation in correlation to the manipulator means except that each camera means must provide, at least intermittently, camera vision of at least the outward end of the manipulator means in at least part of the physical work space to view at least the outer end of the manipulator means and the work object in camera space;

placing a first visual cue means in association with an outward end of the arm;

placing a second visual cue means in association with the object to be engaged by the manipulator means, the first and second visual cue means comprising means which are distinct and identifiable in said camera space from the remainder of the system and any surrounding environment, the first and second visual cue means providing descriptions of three dimensional physical space maneuver objectives in terms of admissible configurations of the visual cue means in the two dimensional camera space of each camera;

receiving signals from the manipulator means and base means and identifying the approximate position and orientation of the manipulator means and base means with respect to the base and surface respectively through the use of known nominal kinematics;

identifying and tracking the visual cue means in the two dimensional camera space of each camera means and repetitively estimating the relationship between the position and orientation of the manipulator means and the location in each camera space of the visual cue means placed on the manipulator means, and using the current estimation of these relationships to select the movement and to command the orientation of the manipulator means which will bring about the admissible configurations of the visual cue means in each camera space which insures successful engagement of the object; and continuously controlling movement and orientation of the manipulator means according to such autonomously selected movement and orientation commands to achieve engagement of the manipulator means with the work object in said physical work space.

41. A method of nonholonomic camera space manipulation comprising:

initially positioning a multiple-degree-of-freedom-of-movement manipulator means in a three dimensional physical work space;

the manipulator means including a motive means for moving the base means in any direction and orientation in at least the work space;

the manipulator means also including at least one end effector means which is moveable with respect to the base means by a manipulator arm having known kinematics;

initially positioning two or more video camera means so that each field of view of each camera means at least intermittently captures the end effector of the manipulator means in the physical work space;

placing at least one visual cue means which is distinguishable in the field of view in each camera means from all else in the field of view on the end effector means and on a work object that at least temporarily enters the work space;

transforming each field of view of the camera means into a two dimensional camera space having a coordinate system so that any visual cue means captured in the camera space is detected and can be identified according to a coordinate position in the camera space;

monitoring the work space with the camera means until at least temporarily the visual cue means of the end effector means and the visual cue means of the work object are concurrently in one field of view;

comparing the camera space locations of the visual cues;

estimating required movement of the base and manipulator arm according to known kinematics, to move the visual cue in camera space to a predetermined position relative the visual cue of the work object and camera space;

estimating the trajectory of the first and second visual cues and camera space; and adjusting movement of the base and manipulator arm according to a current estimate of trajectory of the first and second view visual cues in camera space, known arm relative to the base, and history of movement of the base until the desire configuration is achieved.

42. The means of claim 41 wherein the estimation of movement is computed using algebraic and differential calculations.

* * * * *